United States Patent
Jugl et al.

(10) Patent No.: US 8,181,080 B2
(45) Date of Patent: May 15, 2012

(54) ADAPTIVE HARQ CONTROL FOR EDCH

(75) Inventors: Enrico Jugl, Nuremberg (DE); Stefan Brueck, Nuremberg (DE); Patrick Charriere, West Challow (GB); Jens Mueckenheim, Nuremberg (DE)

(73) Assignee: Alcatel Lucent, Paris (FR)

( * ) Notice: Subject to any disclaimer, the term of this patent is extended or adjusted under 35 U.S.C. 154(b) by 841 days.

(21) Appl. No.: 12/274,961

(22) Filed: Nov. 20, 2008

(65) Prior Publication Data
US 2009/0138778 A1    May 28, 2009

(30) Foreign Application Priority Data
Nov. 23, 2007   (EP) .................................... 07121409

(51) Int. Cl.
*H04L 1/18*    (2006.01)
(52) U.S. Cl. ......................................... 714/749; 714/774
(58) Field of Classification Search .................. 714/774, 714/749
See application file for complete search history.

(56) References Cited

U.S. PATENT DOCUMENTS

| | | | | |
|---|---|---|---|---|
| 5,461,639 A * | 10/1995 | Wheatley et al. | ............. | 370/342 |
| 6,633,552 B1 * | 10/2003 | Ling et al. | ..................... | 370/318 |
| 7,120,448 B2 * | 10/2006 | Brouwer | ....................... | 455/453 |
| 7,181,170 B2 * | 2/2007 | Love et al. | ................. | 455/67.13 |
| 7,197,692 B2 * | 3/2007 | Sutivong et al. | ............. | 714/796 |
| 2003/0231105 A1 * | 12/2003 | Kim et al. | ..................... | 340/10.2 |
| 2005/0123059 A1 * | 6/2005 | Harris et al. | ................... | 375/244 |
| 2005/0138671 A1 * | 6/2005 | Love et al. | ..................... | 725/123 |
| 2005/0204251 A1 * | 9/2005 | Moon et al. | ..................... | 714/748 |
| 2007/0286102 A1 * | 12/2007 | Shimokawa et al. | ......... | 370/310 |
| 2008/0045255 A1 * | 2/2008 | Revel et al. | ..................... | 455/510 |

FOREIGN PATENT DOCUMENTS

| | | |
|---|---|---|
| EP | 1 681 813 A2 | 7/2006 |
| EP | 1 821 425 A1 | 8/2007 |
| EP | 1 868 303 A1 | 12/2007 |
| WO | WO 02/082685 A1 | 10/2002 |
| WO | WO 2006/098440 A1 | 9/2006 |

OTHER PUBLICATIONS

European Search Report.

* cited by examiner

*Primary Examiner* — M. Mujtaba K Chaudry
(74) *Attorney, Agent, or Firm* — Fay Sharpe LLP

(57) ABSTRACT

The present invention relates to a method for transmitting of data frames from user equipment to a base station in a wireless telecommunication network. The method comprises an error control step adapted to retransmit the data frame from the user equipment to the base station, if the received data frame contains errors or if no acknowledge message is received by the user equipment within a predetermined amount of time. The method further comprises a transmission power control step adapted to control a transmission power of the data frames in such a way that the number of retransmissions corresponds to a predetermined number of target retransmission. The number of target retransmission is adapted depending on the traffic load and/or the number of users connected to the base station.

5 Claims, 4 Drawing Sheets

ADAPTIVE HARQ CONTROL FOR EDCH

BACKGROUND OF THE INVENTION

The invention is based on a priority application EP07121409.2 which is hereby incorporated by reference.

The present invention relates to a method for radio transmission of data frames from user equipment to a base station in a wireless telecommunication network, a Radio Network Controller "RNC", a Base Station "BS" and a communication network.

The invention is related to current telecommunication networks such as the Universal Mobile Telecommunications System "UMTS" provide high-speed data communication between wireless devices. UMTS networks introduce new network elements that function according to the specification of the third generation partnership project (3GPP). The network comprises media gateways "MGW", Radio Network Controllers "RNC" and Base Stations "BS". The base stations are also referred to as Node-B. Each base station services a particular cell. In radio communications, cell is a small geographic area of radio coverage served by a base station "BS". A base station "BS" is a wireless communications station installed at a fixed location and used to communicate with user equipment "UE" in a wireless telecommunications system. User equipment "UE" is any device used directly by an end user to communicate. It can be a hand-held telephone, a card in a laptop computer, or other device. The user equipment connects to the base station. A Radio Network Controller "RNC" is the governing element in a radio access network responsible for control of the base stations which are connected to the controller. The Radio Network Controller RNC carries out radio resource management. The Radio Resource Management functionality includes load control, Admission Control, Packet scheduling, Handover control as well as Outer Loop Power Control. The user equipment und base station perform power and quality measurements and send the measurement results to the radio network controller, which performs the handover control and power control based on the received measurement results.

High-Speed Uplink Packet Access "HSUPA" is a third generation mobile telephony protocol. Uplink refers to data transmission form the user equipment, such as a mobile telephone, to the base station. The technical purpose of the HSUPA protocol is to improve the performance of uplink dedicated transport channels, i.e. to increase the capacity and throughput and reduce delay.

The HSUPA uses an uplink enhanced dedicated channel (Enhanced DCH) on which it employs link adaptation methods. It is an enhancement of the uplink dedicated channel (DCH) with focus on more efficient transport of packet switched (PS) data. In packet switching discrete blocks of data (packets) are routed between nodes over data links shared with other packets. In contrast, circuit switched networks establish a dedicated channel between nodes and terminals. The dedicated channel cannot be used by other nodes or terminals.

In the 3GPP UMTS standard of Release 6 the physical channel supports a maximum data rate of up to 5.7 Mbit/s due to turbo coding and code multiplexing of up to two channelization codes of spreading factor two plus two channelization codes of spreading factor four. Two types of transmission-time-intervals (TTI) are supported, 10 ms and 2 ms. Similar to High-Speed Downlink Packet Access (HSDPA), HSUPA supports a MAC-e layer (Media access control layer), which is implemented in the Base Station.

The base station supports fast scheduling. Fast scheduling allows a tighter control of the uplink resources, which allows larger settings of the uplink resource limits. Furthermore soft and softer handovers are supported by the enhanced dedicated channel (E-DCH). The term handover refers to the process of transferring an ongoing call or data session from one channel connected to the core network to another. A Soft handover or soft handoff refers to a feature used by the CDMA and WCDMA standards, where a cell phone is simultaneously connected to two or more cells (or cell sectors) during a call. If the sectors are from the same physical cell site (a sectorized site), it is referred to as softer handoff.

The base station may perform HARQ and fast scheduling. HARQ refers to Hybrid ARQ (HARQ), which is a variation of the ARQ error control method. Automatic Repeat-reQuest (ARQ) is an error control method for data transmission which uses acknowledgments and timeouts to achieve reliable data transmission. An acknowledgment is a message sent by the receiver to the transmitter to indicate that it has correctly received a data frame. A timeout is a reasonable point in time after the sender sends the data frame; if the sender does not receive an acknowledgment before the timeout, it usually re-transmits the frame until it receives an acknowledgment or exceeds a predefined number of re-transmissions.

In standard ARQ error-detection information (ED) bits are added to data to be transmitted (such as cyclic redundancy check, CRC). In Hybrid ARQ forward error correction (FEC) bits are also added to the existing Error Detection (ED) bits (such as Reed-Solomon code or Turbo code). As a result Hybrid ARQ performs better than ordinary ARQ in poor signal conditions, but in its simplest form this comes at the expense of significantly lower throughput in good signal conditions. There is typically a signal quality cross-over point below which simple Hybrid ARQ is better, and above which basic ARQ is better.

FIG. 1 discloses a standard implementation of a hybrid ARQ. An N-channel parallel HARQ operation is disclosed in FIG. 1. The data packets in FIG. 1 are transferred subsequently as sub-channels in one communication channel. The time domain is divided into several recurrent timeslots of fixed length, one for each sub-channel N. Four sub-channels are shown in FIG. 1, namely channels Ch1, Ch2, Ch3 and Ch4. Each channel is connected to its immediately preceding channel by a dotted line, which is either referenced by the sign NACK and ACK. ACK stands for acknowledge. This signal is transmitted to the user equipment, if the received data packet has been correctly transmitted. In this case a new data packet is transmitted across the channel. Alternatively, a not acknowledge NACK signal is sent to the user equipment, if the received data packet contains errors. Consequently, the data packet is retransmitted in the subsequent sub-channel. The maximum number N of HARQ sub-channels for uninterrupted data transfer depends on the transmission-time-interval. In case a transmission time interval of 10 msec is supported by the enhanced dedicated channel, then 4 HARQ sub-channels may occur. Alternatively, if the transmission time interval is equal to 2 msec, then up to 8 HARQ sub-channels are supported.

The round trip time "RTT" for N HARQ sub-channels is equal to N*TTI, wherein TTI is the transmission time interval. Consequently, the higher number of retransmissions introduces additional transmission delay and reduces throughput of the data transfer. If the first transmission fails, then the subsequent HARQ retransmission can be combined with the initial transmission at the base station in order to reduce the required number of retransmissions.

Conventionally, the enhanced dedicated channel E-DCH comprises an inner loop power control between the base station and the user equipment. The inner loop power control controls the power of the data signals from the user equipment to the base station; uplink power. A target for the signal-to-interference ratio of the transmitted data signals is set. If the detected signal-to-interference ratio is lower than the target signal-to-interference ratio, then the transmit power on uplink is increased. Conversely, if the detected signal-to-interference ratio is higher than the target signal-to-interference ratio, then the transmit power is decreased.

Furthermore, the enhanced dedicated channel E-DCH comprises an outer loop power control. The outer loop power control is implemented between the base station and the radio network controller connected to the base station; it controls the target signal-to-interference ratio implemented in the base station. The radio network controller transfers the target signal-to-interference ratio to the base station. The purpose of the outer loop power control is to control the actual number of HARQ retransmissions, which occur in the uplink channel between the user equipment and the base station (Node-B). The outer loop power control increases the target signal-to-interference ratio, if the number of actual HARQ retransmissions exceeds a predetermined number M of target HARQ retransmissions. Conversely, the target signal-to-interference ratio is reduced, if the number of actual HARQ retransmissions is lower than the target number M of HARQ retransmissions. If the packet data unit PDU is correctly received after exactly M target HARQ retransmissions, then the target signal-to-interference ratio is left unchanged. The outer loop power control adjusts the target signal-to-interference ratio to get in average a fixed number M of target HARQ retransmissions.

The state of the art outer and inner loop control algorithm is disadvantageous because it may not provide an optimum throughput. In particular, the user throughput depends in general on the number of users connected to the base station and requiring uplink data transmission to the base station. FIG. 2 depicts a graph of the user throughput in Kbit/s versus the number of users (user equipment) connected to the respective base station. The throughput is depicted for two different fixed target HARQ transmissions. A first graph relates to the achieved throughput in case of 2 target HARQ transmissions (2Tx, i.e. 1 target HARQ retransmission) and a second graph represents the achieved throughput for 1 target HARQ transmission (1Tx, i.e. 0 target HARQ retransmission). As can be seen in FIG. 2, the throughput in case of 1 target HARQ transmission is higher than 2 target HARQ transmissions, if the number of users is lower than 4. But, in case of more than 4 user equipments, the throughput is larger for two target transmissions. The state of the art power control algorithm does not provide an optimum throughput irrespective of the load and number of users in a particular cell.

SUMMARY OF THE INVENTION

Therefore, it is object of the present invention to provide an outer loop power control for a data transmission in a wireless telecommunication network, which optimizes the data throughput irrespective of the number of users in the cell.

The object is solved by the invention defined in the appended claims. The present invention relates to a method for transmission of data frames from user equipment "UE" to a base station "BS" in a wireless telecommunication network, such as the Universal Mobile Telecommunications system "UMTS". The method comprises an error control step, which is adapted to retransmit a data frame from the user equipment to the base station if the received data frame contains errors or if no acknowledge message is received by the user equipment within a predetermined amount of time. Such an error control step may correspond to the automatic repeat-request method ARQ or hybrid automatic repeat-request control method. The method further comprises a transmission power control step, which is adapted to control a transmission power of the data frames in such a way that the number of retransmissions corresponds to a predetermined number of target retransmission. The number of target retransmission is adapted depending on the traffic load or the number of users connected to the base station. Consequently, the target number of retransmissions is adaptive. In case of a HARQ algorithm, the inventive method represents an adaptive HARQ methodology. The adaptive number of target HARQ retransmissions allows the method to increase the user throughput depending upon the number of users or the traffic load. Therefore, an optimum number of target retransmissions may be chosen, such that the user throughput is greater irrespective of the number of users or the traffic load.

Preferably, the transmission power control step comprises an inner loop power control step and an outer loop power control step. The inner loop power control step controls the transmission power such that a target signal-to-interference ratio is achieved. For example, if the actually detected signal-to-interference ratio is smaller than the target ratio, then the power control may increase the transmission power. The outer loop power control controls the signal-to-interference ratio target such that the number of target HARQ retransmissions is achieved. The inner loop control may adapt fast to changes in the cell, whereas the outer loop power control may adapt the target signal-to-interference ratio in order to achieve an optimum throughput. In case of heavy traffic load or many users, the interference within the cell serviced by the base station necessarily increases. Therefore, it is favorable to adapt the target signal-to-interference ratio according to the circumstances, i.e. the number of users and/or the traffic load.

According to a preferred embodiment, the number of users can be determined according to the size of transport blocks received by a radio network controller connected to the base station.

The present invention also relates to a Radio Network Controller "RNC" connectable to a base station for wireless radio communication in a network. The RNC implements the outer loop power control device, which controls a target signal-to-interference ratio such that the number of target HARQ retransmissions is achieved, said signal-to-interference ratio target being forwarded to the base station. The retransmission number controller controls the number of target retransmission depending on the traffic load or the number of users connected to the base station. The outer loop control is performed by the radio network controller. The transmission power is corrected indirectly by controlling the target signal-to-interference ratio. Controlling the target signal-to-interference ratio is preferable, since the preferred signal to interference ratio depends on the number of users or traffic load of the cell. An increase in the number of users necessarily increases the signal-to-interference ratio. Therefore, the target signal-to-interference ratio should be adapted correspondingly.

The inner loop power control of the present invention is realized by a base station. Therefore, the present invention relates equally to a Base Station "BS" for wireless radio communication with user equipment connected to the base station in a wireless telecommunication network. The base station of the present invention comprises an error control device for requesting a retransmission of a data frame from the User Equipment to the base station, if the received data frame contains errors. Furthermore, an inner loop power control device is provided, which controls the transmission power such that a target signal-to-interference ratio is achieved. However, the target signal-to-interference ratio is adapted by the adaptive outer loop power control, which transfers the resulting target signal-to-interference ratio to the base station. The base station of the present invention implements the target signal-to-interference ratio received from the radio network controller.

BRIEF DESCRIPTION OF THE DRAWINGS

A preferred embodiment of the present invention is described hereafter with reference to the accompanied drawings.

The method according to the preferred embodiment of the present invention is denoted as "adaptive HARQ control method". It is typically applied to upstream traffic channels on an enhanced dedicated channel of a UMTS radio network. The adaptive HARQ control method comprises an inner loop control and an outer loop control. Both control loops operate simultaneously.

The inner loop power control controls the transmission power from user equipment to a BS. The transmission power is adapted such that a signal-to-interference ratio target is achieved. Therefore, BS constantly monitors the signal-to-interference of data frames received from the user equipment connected to the BS. If the monitored signal-to-interference exceeds the target signal to interference ratio, then the transmission power is reduced. If the monitored signal-to-interference ratio is lower than the target signal-to interference ratio, then the transmission power is increased. As a result, the monitored signal-to-interference ratio approaches the target signal-to-interference ratio.

The outer loop power control controls the target signal-to-interference ratio. This means that the target signal-to-interference ratio is changed such that a number of target HARQ retransmissions is achieved. The radio network controller connected to the BS adapts the target-signal-to-noise ratio and transmits the adapted value to the BS. Thereafter, the BS performs the inner loop control with a new target signal-to-interference ratio. To this end the radio network controllers constantly monitors the actual number of retransmissions. Retransmissions from the user equipment occurs each time, the data frame from the user equipment is faulty. If the actual number of retransmissions is larger than the target number of retransmissions, then the target signal-to-interference ratio is increased by a certain up step. In turn, the BS performing the inner loop control tends to increase the transmission power. However, if the actual number of retransmissions is smaller than the target number of retransmissions, then the target signal-to-interference ratio is reduced by a certain down step. In turn, the BS tends to reduce the transmission power.

According to the preferred embodiment of the present invention, the radio network controller additionally adapts the target number of HARQ retransmissions. The target number of retransmissions is increased if he number of users in the cell of the BS increases or if the load of the cell increases. The control of the target number of retransmissions does not constitute a loop control. It simply adjusts the target number of retransmissions in accordance with the number of users, such that the user throughput and the average cell throughput is maximized.

Figure 2:
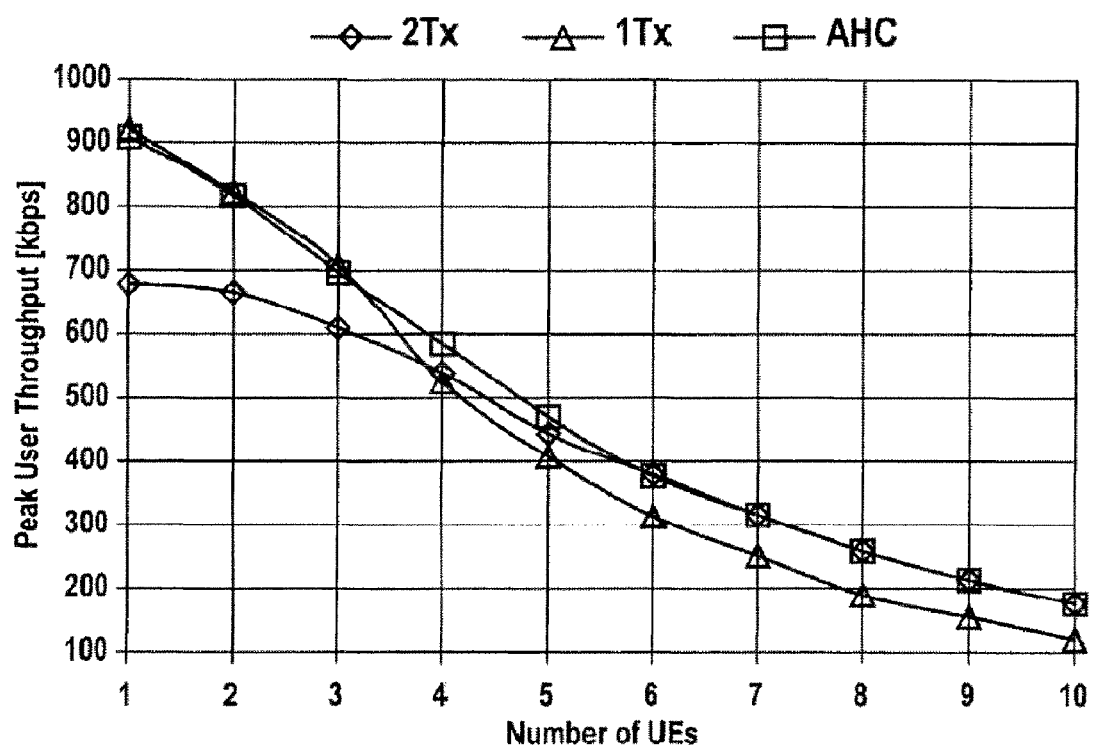
FIG. 2 shows a graph of the user throughput versus the number of users for a state of the art usage of a fixed number of HARQ transmission (1Tx, 2Tx) and adaptive HARQ control (AHC) according to the embodiment of the present invention.

The effect of this adjustment may be seen in FIG. 2. FIG. 2 shows the user throughput versus the number of users in the cell. The user throughput is defined as mean user throughput per 2 seconds interval averaged over all RF conditions (channel profiles in the radio channel mix). The method of the present invention termed adaptive HARQ control is represented by the graph AHC in FIG. 2. The corresponding graphs for a fixed number of target retransmissions, in particular 1 target transmission (1Tx, i.e. 0 retransmission) and 2 target transmissions (2Tx, i.e. 1 retransmission) are shown as a reference. From FIG. 2 it is clear that the user throughput according to the present invention is greater than or equal to the user throughput for fixed target retransmissions. In case less than 4 users are in the cell, the AHC user throughput is equal to the 1Tx user throughput and greater than the 2Tx user throughput. The reason for this is that the adaptive control of the present invention reduces the number of target transmissions from 2 to 1 if the number of users drops below four. FIG. 2 further shows that the AHC user throughput is roughly equal to the 2Tx user throughput if the number of users is greater than or equal to 4. Again the reason for this is the adaptive target retransmission control of the present invention.

Figure 3:
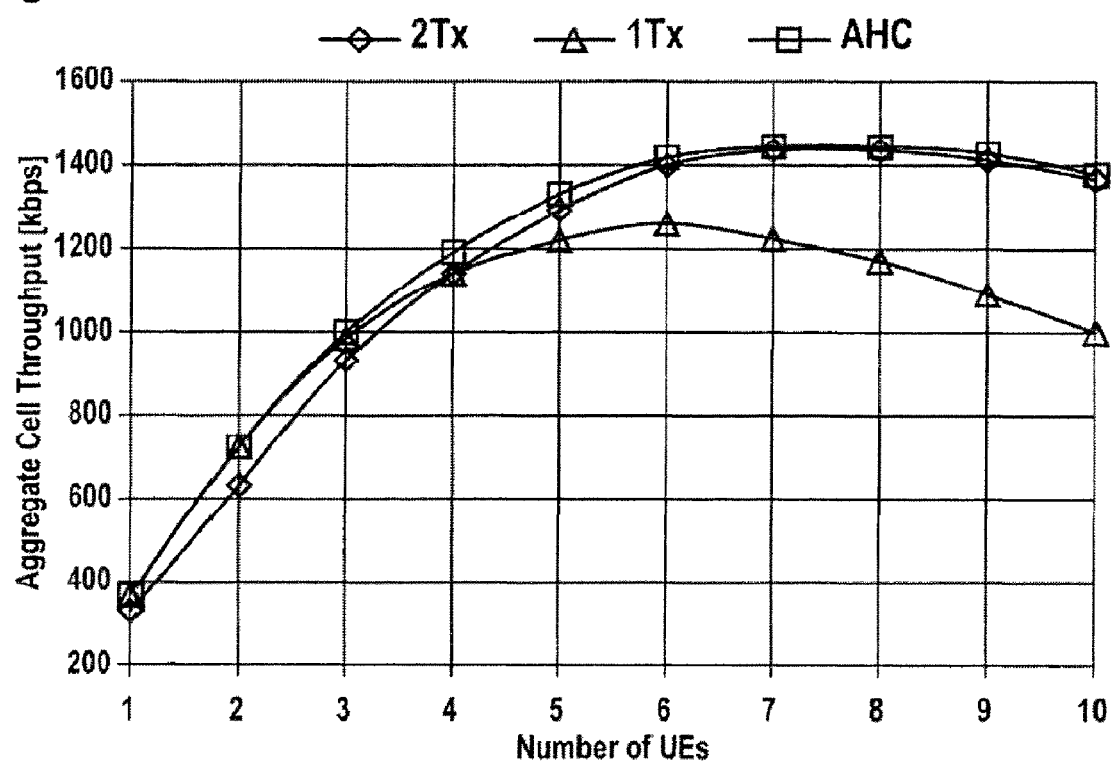
FIG. 3 shows a graph of the aggregate cell throughput versus the number of users for a state of the art usage of a fixed number of HARQ transmission (1Tx, 2Tx) and adaptive HARQ control (AHC) according to the embodiment of the present invention.

FIG. 3 shows the aggregate cell throughput versus the number of users in the cell. The cell throughput is averaged over the whole time including idle periods. Again, this is shown for the case of fixed target transmissions (1Tx and 2Tx) and adaptive target control (AHC). The aggregate cell throughput according to the present invention (AHC) is larger than the aggregate cell throughput for one (1Tx) or two (2Tx) target transmissions. Again, the adaptive number of target transmissions is switched from 1 to 2 at 4 users in the cell. Thereby, the greater aggregate cell throughput for 2 target transmissions and more than 4 users is achieved by the invention according to the present invention.

Figure 4:
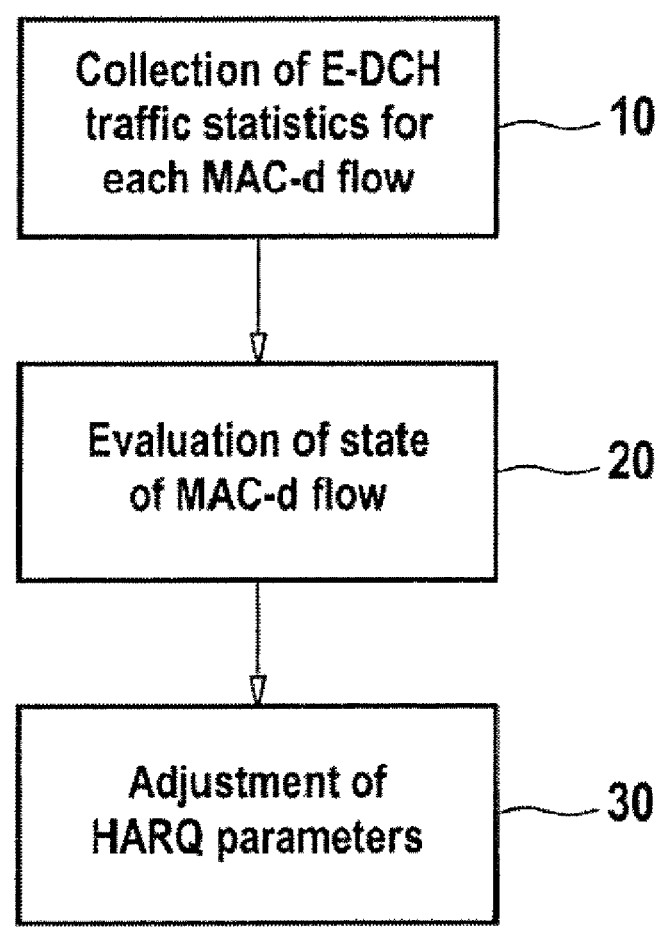
FIG. 4 shows a block diagram depicting the method for data transmission according to the preferred embodiment of the present invention.

The adaptation of the number of target retransmissions according to the preferred embodiment of the present invention is performed essentially in three steps. FIG. 4 schematically depicts a block diagram of the three steps. A first step 10 consists of collecting data. This data must be indicative of the number of users in a particular cell. Instead of monitoring the number of active users and/or the traffic load in a particular cell, the radio network controller RNC may monitor the size of the transport blocks (MAC-es PDUs) received by the RNC. It is assumed that a small number of UEs are in the cell and/or the load is low, if the transport blocks are large. Conversely, small transport blocks are indicative of a larger number of user or heavy traffic load.

Figure 1:
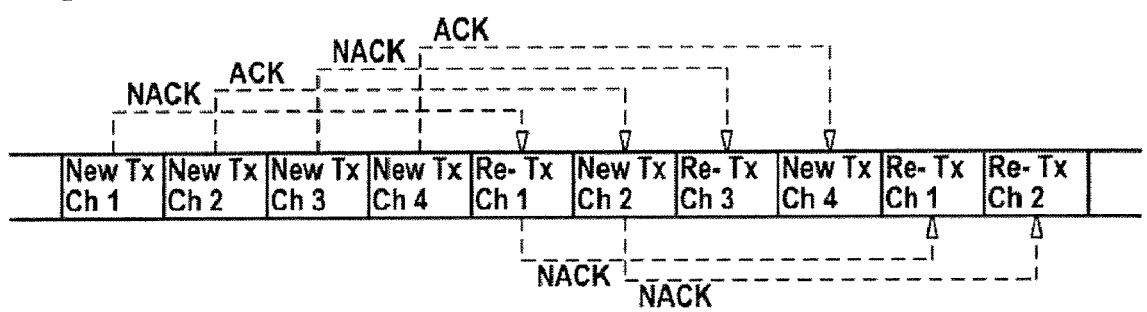
FIG. 1 shows a representation of an enhanced dedicated channel "E-DCH", on which a standard implementation of a hybrid automatic repeat request "HARQ" is running.

The collection of data, in particular E-DCH traffic statistics for each MAC-d flow, as in step 10 of FIG. 1 runs independently for each MAC-d flow and is triggered on the reception of data for the specific MAC-d flow. Initially, the E-DCH traffic statistic for this MAC-d flow is updated according to the received MAC-es PDU size.

The radio network controller RNC must be aware of the number of target HARQ transmissions, which should be used for the outer loop power control. Therefore, the radio network controller RNC distinguishes between two states S1 and S2 for each MAC-d flow. State S1 corresponds to 1 target HARQ transmission (i.e. 0 HARQ retransmission); state S2 corresponds to 2 target HARQ transmissions (i.e. 1 HARQ retransmission). If the current state is S1 (target number of HARQ transmissions is 1), then the radio network controller shall monitor the following events:

$$S1: X = X = \begin{cases} 1 & \text{if received } MACesPDUsize \geq PDU - Thresh1 \\ 0 & \text{if received } MACesPDUsize < PDU - Thresh1 \end{cases}$$

X is representative of the size of the received transport block. X equal to zero means that a small transport block has been received. X equal to one means that a large transport block has been received. PDU-Thresh1 indicates the threshold used for differentiating between large and small transport blocks. Additionally, a moving average of the size of the transport blocks is calculated by applying exponential smoothing. The resulting weighted average E(X) may be calculated in the following way:

$$E_t(X_t) = f \cdot X_t + (1-f) \cdot E_{t-1}$$

$E_t$ represents the weighted average of X at the point in time t. $X_t$ represents the value for X at the point in time t. $E_{t-1}$ is the previous weighted average. f represents the weighting factor, it may lie between 0 and 1. Values of f close to unity have less of a smoothing effect and give greater weight to recent changes in the data, while values of f closer to zero have a greater smoothing effect and are less responsive to recent changes. The initial value for E(X)=0.

Finally, E(X) represents the probability that the UE is using transport blocks equal or larger than PDU-Thresh1 (or PDU-Thresh2, see below).

The equivalent statistics are to be performed if the radio network controller is if the state S2.

$$S2: X = X = \begin{cases} 1 & \text{if received } MACesPDUsize \geq PDU - Thresh2 \\ 0 & \text{if received } MACesPDUsize < PDU - Thresh2 \end{cases}$$

Thus, the usage of two different thresholds PDU-Thresh1 and PDU-Thresh2 is supported. Therefore, the determination of large or small PDU sizes is slightly different depending on the state of the RNC. This way it is possible to apply a larger hysteresis. The overall judgement of large and small PDU size is essentially the same in both the first and the second state S1 and S2.

Now turning back to FIG. 4, the next step 20 is the step of evaluating the collection of data from step 1. First of all, the state of the radio network controller is determined. If the RNC is in the state S1 (1 target HARQ transmission) and the measured probability of the occurrence of PDU sizes, equal or larger than PDU-Thres1, is equal or lower than the pre-defined probability Thres1 (E(X)≦Thresh1), then the number of users or the traffic load is deemed to be large. A large number of users calls for a larger number of target HARQ transmissions (for example 2). Therefore, the radio network controller switches from state S1 to state S2. This process is exemplified by the following commands:

IF S1 and E(X)≦Thresh1 then S1→S2

In case the radio network controller is in the state S2 and the measured probability of the occurrence of PDU sizes, equal or larger than PDU-Thres2, is equal or higher than the pre-defined probability Thres2 (E(X)≧Thresh2), then few users are assumed to be in the cell. Consequently, the RNC switches into state S1. That is, the target number of HARQ transmissions is reduced e.g. from 2 to 1. Again the above procedure is exemplified by the following command:

IF S2 and E(X)≧Thresh2 then S2, S1

The step of switching between states S1 and S2, i.e. changing from 1 to 2 target HARQ transmissions or vice versa, is performed in step 30 of FIG. 4.

The adaptive HARQ control method according to the preferred embodiment has plural advantages. Both the aggregate cell throughput as well as the user throughput are optimized for large and small numbers of users at the same time. By using the individual MAC-d flow traffic statistics there is no need to track the tracking the traffic status of the cell. In particular, the number of users must not be monitored directly. Last but not least, the algorithm may be implemented on the radio network controllers only. Therefore, the BS must not be changed. It only impacts the RNC user plane but not the control plane and allows for simple implementation.

The invention claimed is:

1. A method for transmitting of data frames from a user equipment to a base station in a wireless telecommunication network, said method comprising:
   retransmitting a particular data frame from the user equipment to the base station, if a previously received version of the particular data frame contains errors or if no acknowledge message is received by the user equipment within a predetermined amount of time in regard to a previously transmission of the particular data frame, and
   controlling a transmission power of data frames generally by increasing the transmission power, if an actual number of retransmissions is larger than a target number of retransmissions and decreasing the transmission power, if the actual number of retransmissions is smaller than the target number of retransmissions, wherein
   the target number of retransmissions is set as a function of a number of users connected to the base station, wherein the target number of retransmissions is increased if the number of users connected to the base station increases and wherein the number of users connected to the base station is determined according to an average size of transport blocks received by a radio network controller connected to the base station, wherein the average size of the transport blocks is determined by calculating a moving average of the size of the transport blocks by applying exponential smoothing.

2. The method according to claim 1, wherein controlling the transmission power comprises:
   controlling the transmission power such that a signal-to-interference ratio target is achieved, and
   controlling the signal-to-interference ratio target such that the number of target retransmissions is achieved.

3. The method according to claim 1, further comprising performing at least one of an automatic repeat request "ARQ" error control method and a hybrid automatic repeat request "HARQ" error control method wherein the target number of retransmissions is increased from one to two, if the average size of the transport blocks rises above a first threshold used for differentiating between large and small transport blocks and the target number of retransmissions is decreased from two to one, if the average size of the transport blocks falls below a second threshold used for differentiating between large and small transport blocks.

4. A radio network controller for controlling an associated base station for wireless radio communication with user equipment in a wireless telecommunication network, the radio network controller comprising:
- an error control device for requesting a retransmission of a data frame from the user equipment to the base station, if an earlier received version of the data frame contains errors,
- a transmission power control device adapted to control a transmission power of data frames by increasing the transmission power, if an actual number of retransmissions is larger than a target number of retransmissions and decreasing the transmission power, if the actual number of retransmissions is smaller than the target number of retransmissions, wherein
- a retransmission target determiner that sets the target number of retransmissions as a function of a number of users connected to the base station, wherein the target number of retransmissions is increased, if the number of users increases and wherein the number of users is determined according to an average size of transport blocks received by the radio network controller, wherein the average size of the transport blocks is determined by calculating a moving average of the size of the transport blocks by applying exponential smoothing.

5. The radio network controller according to claim 4, wherein the transmission power control device is adapted to:
- control the transmission power such that a signal-to-interference ratio target is achieved, and
- control the signal-to-interference ratio target such that the number of target retransmissions is achieved.

* * * * *